(12) United States Patent
Fang et al.

(10) Patent No.: US 10,869,578 B2
(45) Date of Patent: Dec. 22, 2020

(54) MULTI-COMPARTMENT CONTAINER WITH A FLEXIBLE PARTITION

(71) Applicant: MUNCHKIN, INC., Van Nuys, CA (US)

(72) Inventors: Ruth Hsin-Ju Fang, Monterey Park, CA (US); Thomas E. Birkert, West Hills, CA (US); Kim Fung Dick Yiu, Hong Kong (CN)

(73) Assignee: Munchkin, Inc., Van Nuys, CA (US)

( * ) Notice: Subject to any disclaimer, the term of this patent is extended or adjusted under 35 U.S.C. 154(b) by 0 days.

(21) Appl. No.: 14/470,659

(22) Filed: Aug. 27, 2014

(65) Prior Publication Data

US 2015/0144657 A1     May 28, 2015

Related U.S. Application Data

(60) Provisional application No. 61/909,341, filed on Nov. 26, 2013, provisional application No. 62/000,974, filed on May 20, 2014.

(51) Int. Cl.
*A47J 47/01* (2006.01)
*A47J 47/04* (2006.01)

(52) U.S. Cl.
CPC .............. *A47J 47/01* (2013.01); *A47J 47/04* (2013.01)

(58) Field of Classification Search
CPC .......... B65D 81/32; A47G 11/00; A47J 47/01; A47J 47/04
USPC ................ 222/139, 142.1, 142.6, 142.9, 342
See application file for complete search history.

(56) References Cited

U.S. PATENT DOCUMENTS

| | | |
|---|---|---|
| 331,415 A | 1/1885 | Cleveland |
| 1,817,562 A | 8/1931 | Hodge |
| 1,896,827 A | 2/1933 | Neely |
| 2,016,488 A | 10/1935 | Eckhaus |
| 2,502,449 A | 4/1945 | Garberding |
| 2,734,306 A | 2/1956 | Holdeman |
| 2,774,466 A | 12/1956 | Liska |
| 2,953,242 A | 9/1960 | Shaw |
| 3,052,368 A | 9/1962 | Atkins et al. |
| 3,144,152 A | 8/1964 | Kopp |
| 3,334,731 A | 8/1967 | Dale |
| 4,261,468 A | 4/1981 | Krebs |
| 4,380,307 A * | 4/1983 | Stillinger ............. B65D 47/265 222/142.9 |
| 4,993,584 A | 2/1991 | MacArio |
| 5,415,312 A | 5/1995 | Mueller |
| D376,734 S | 12/1996 | Petrie |
| 5,890,627 A * | 4/1999 | Storey .................... B65D 25/04 222/129 |
| 7,090,072 B1 | 8/2006 | Elliott |
| 7,806,298 B2 | 10/2010 | Kraus et al. |
| 8,672,123 B1 * | 3/2014 | Vallejo ...................... A61J 9/00 206/219 |
| 8,777,044 B1 | 7/2014 | Raymus |
| 8,955,705 B2 * | 2/2015 | Vogel ................... B65D 47/265 220/253 |

(Continued)

*Primary Examiner* — Jeremy Carroll
(74) *Attorney, Agent, or Firm* — Robert Z. Evora, Esq.

(57) ABSTRACT

A container assembly having a container, a lid having a spout, and a partition to separate the container into multiple subcompartments. The partition has a flexible edge which is in contact with an inner surface of the lid. When the lid rotates about the container, the flexible edge is biased against the lid and is capable of being deformed.

20 Claims, 17 Drawing Sheets

(56) References Cited

U.S. PATENT DOCUMENTS

| | | | | |
|---|---|---|---|---|
| 2003/0234062 A1* | 12/2003 | Wei | ................. | A47J 47/01 |
| | | | | 141/319 |
| 2007/0039960 A1 | 2/2007 | Pawlik | | |
| 2009/0188929 A1 | 7/2009 | Sims | | |
| 2012/0305582 A1* | 12/2012 | Dunn | ................. | A47G 19/2272 |
| | | | | 220/714 |
| 2014/0144926 A1* | 5/2014 | Wolf | ................. | A47J 47/01 |
| | | | | 222/241 |
| 2015/0041500 A1* | 2/2015 | Ismail | ................. | A47G 19/34 |
| | | | | 222/434 |

\* cited by examiner

US 10,869,578 B2

MULTI-COMPARTMENT CONTAINER WITH A FLEXIBLE PARTITION

CROSS REFERENCE TO RELATED APPLICATION

This application claims priority to U.S. Provisional Application Ser. No. 62/000,974 filed May 20, 2014 and to U.S. Provisional Application Ser. No. 61/909,341 filed Nov. 26, 2013; the contents of all of which are hereby incorporated by reference herein in their entirety into this disclosure.

TECHNICAL FIELD

The subject disclosure relates generally to a small item container and, more particularly, to a multi-compartmented dispenser having a flexible partition.

BACKGROUND

Parents on the go often times have to contend with packaging and carrying premeasured formula and cereal outside of the home. Consequently, meeting the dietary needs of a small child while traveling away from home can be quite challenging and complicated for a parent or caregiver.

Conventionally, various containers having multiple compartments have been used to separate different baby formulas or other granulated food items. However, these containers have the tendency to cross contaminate the contents of the various separated items disposed in each of the compartments. When conventional containers are flipped over to dispense the formula, or are tossed about when moved or carried, the premeasured contents from one compartment will often leak into an adjacent compartment and contaminate the contents therein.

Thus, there is a long-standing need to have a container configured to effectively address these needs.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Particular embodiments of the present invention will now be described in greater detail with reference to the figures.

Figure 1:
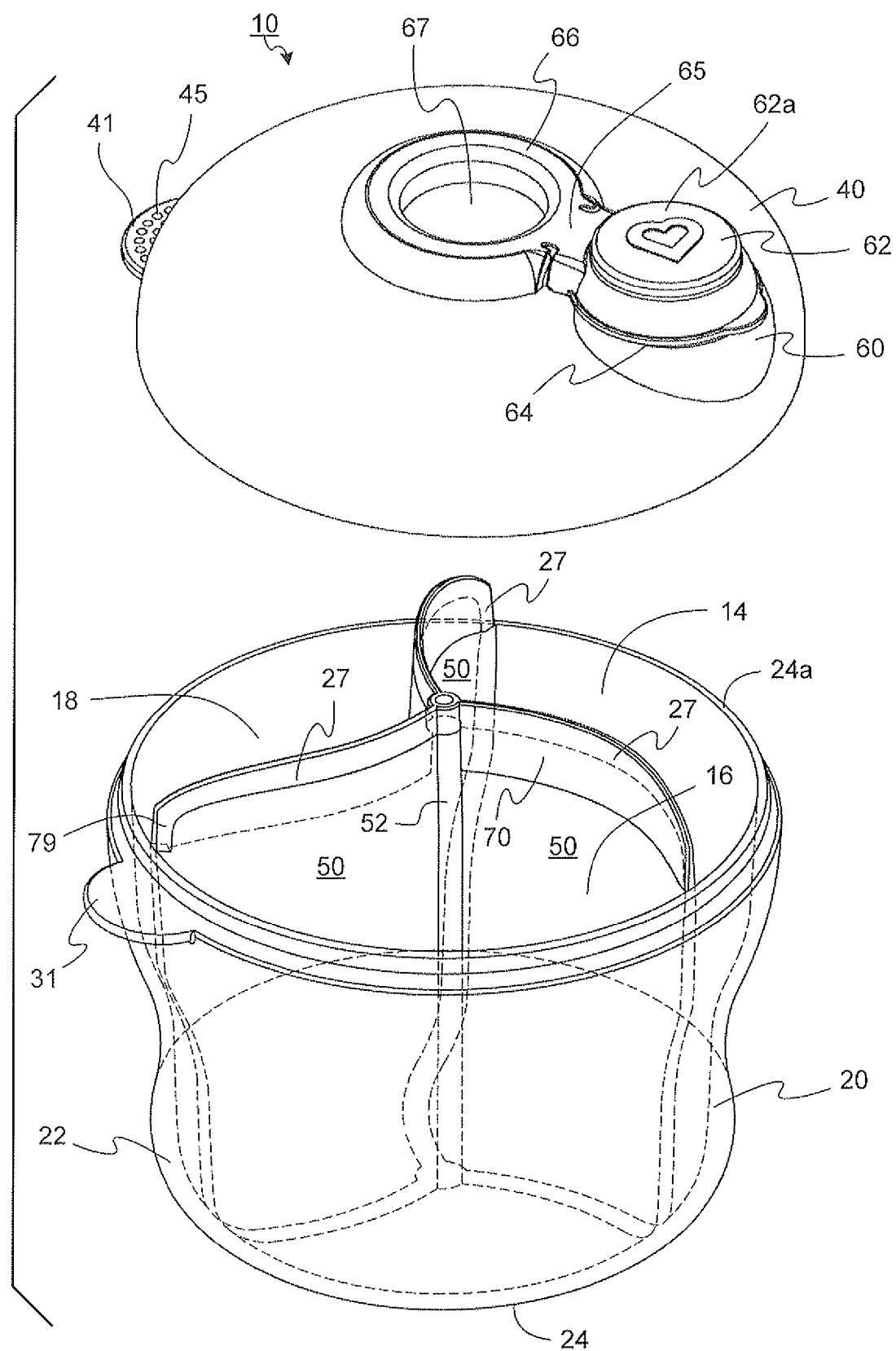
FIG. 1 illustrates an exploded view of an exemplary multi-compartment container assembly according to the subject disclosure.

FIG. 1 illustrates an exploded view of multi-compartment container assembly 10. The container assembly 10 includes a container 20 with a non-spill lid 40. Various granular or small items can be used with the container assembly, including but not limited to for example, formula, crackers, cookies, chopped fruits, vegetables, popcorn, shelled nuts, potato chips, dry cereal, candies, raisins or other granular or small snack food.

Figure 2:
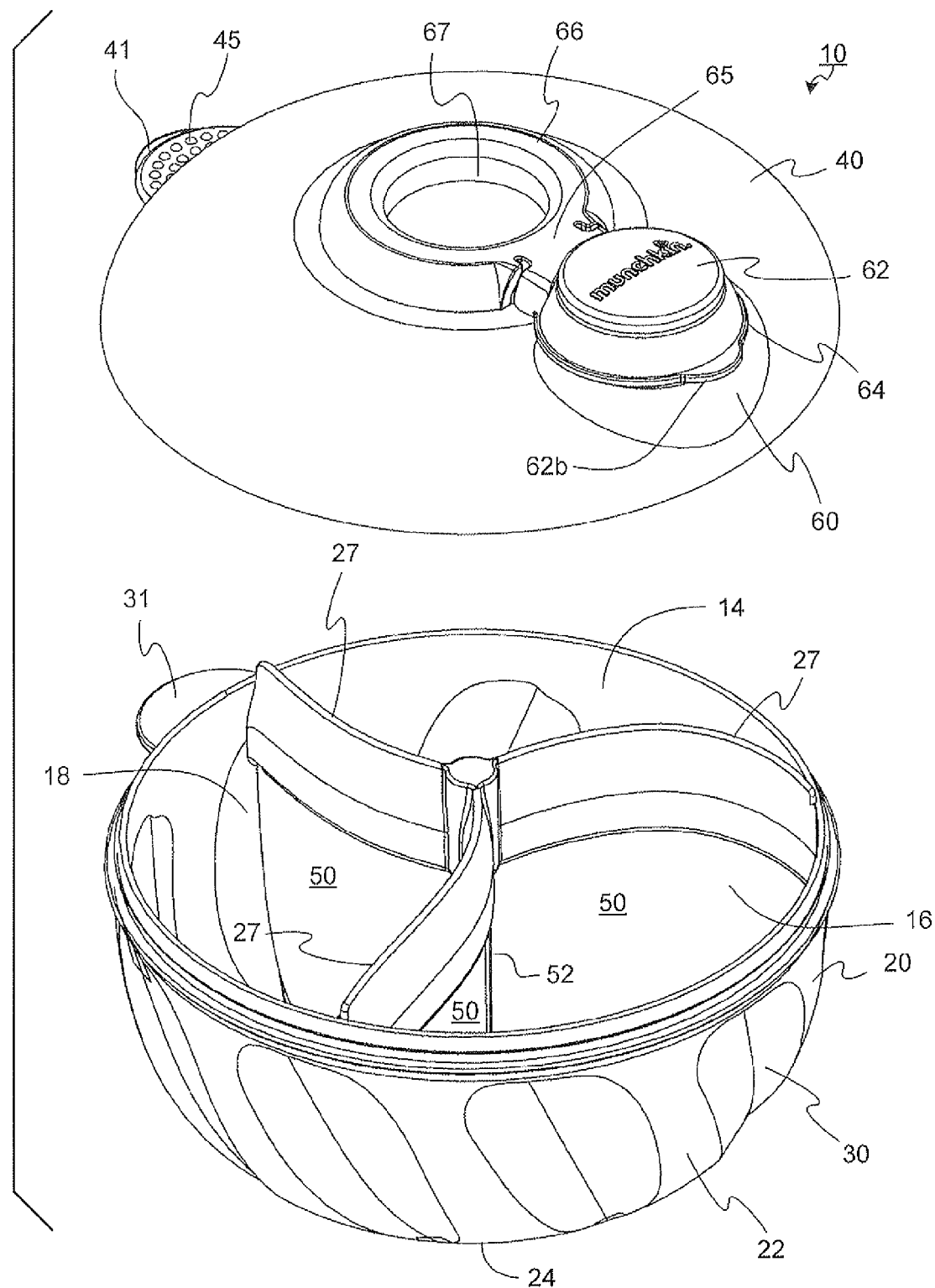
FIG. 2 depicts an exploded view of another exemplary multi-compartment container assembly according to the subject disclosure.

The container 20 may be configured in any size or shape. As shown, the container 20 is in the shape of a bowl. As shown in FIG. 2, the container 20 may include various gripping indentations 30 disposed along a side wall 22 of the bowl-shaped outer surface. The gripping indentations 30 may be disposed radially symmetric around the circumference of the container 20 to improve grippability of the bowl by a user. Texture may be provided to the gripping indentations 30 on side wall 22 of the container 20 or lid 40 to promote a low-slip surface and promote a firm grip via the indentations 30 or the like.

The container 20 includes the bowl-shaped wall 22. The container 20 has a lower closed end 24 and an open upper end 24a. The inner cavity of the container 20 defines an interior space divided into a plurality of sub-compartments 14, 16 and 18. The interior space of the container 20 is divided into each of the sub-compartments 14, 16 and 18 by radially extending partitions 50. The radially extending partitions 50 extend radially outward from a center 52 of the container 20 and upward to a top peripheral upper end 27 that scrapes, flexes and/or swipes against an inner surface of the lid 40, when the lid 40 is secured to the container 20.

Figure 3:
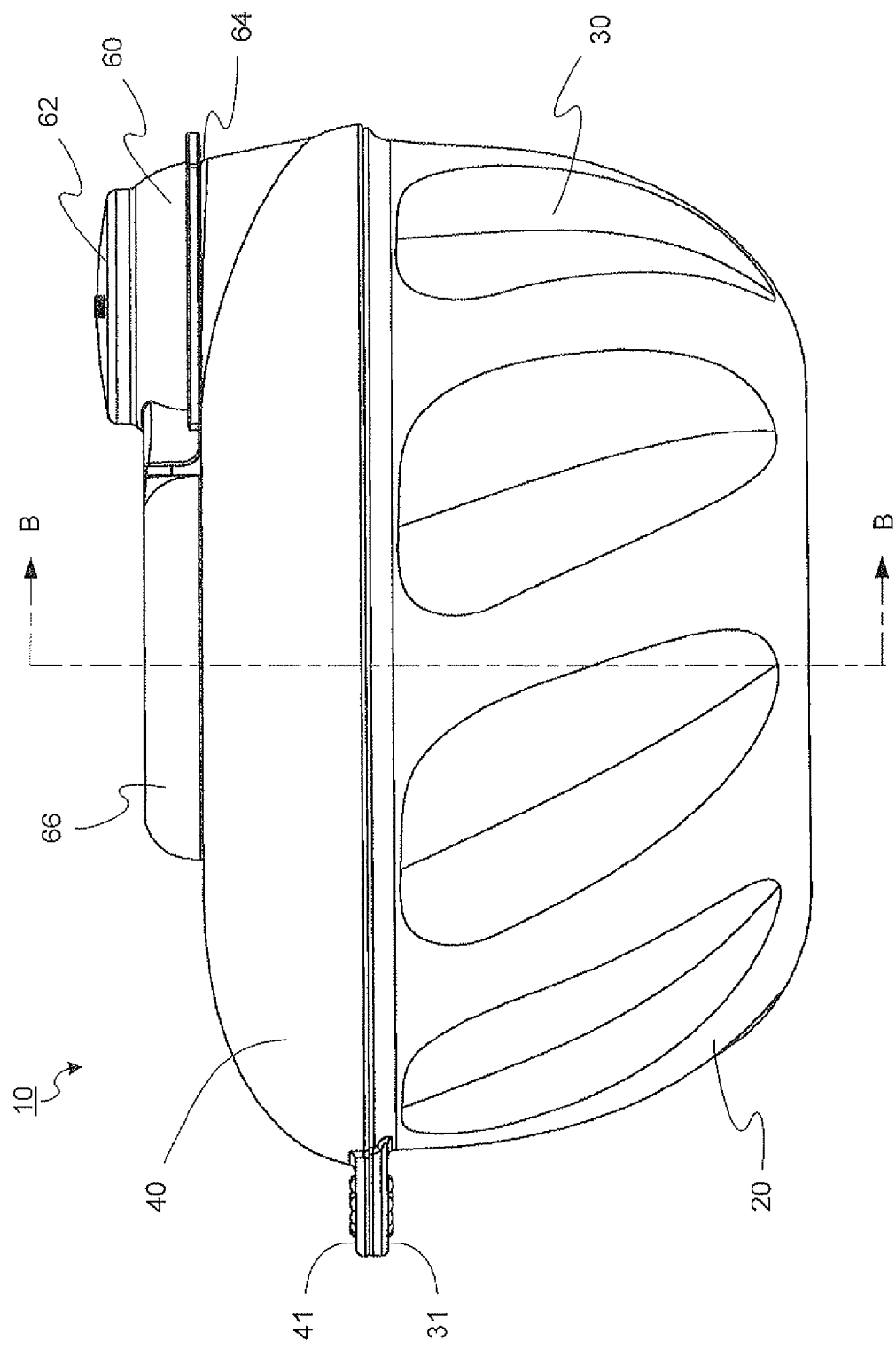
FIG. 3 shows a side view of the multi-compartment container assembly.
Figure 4:
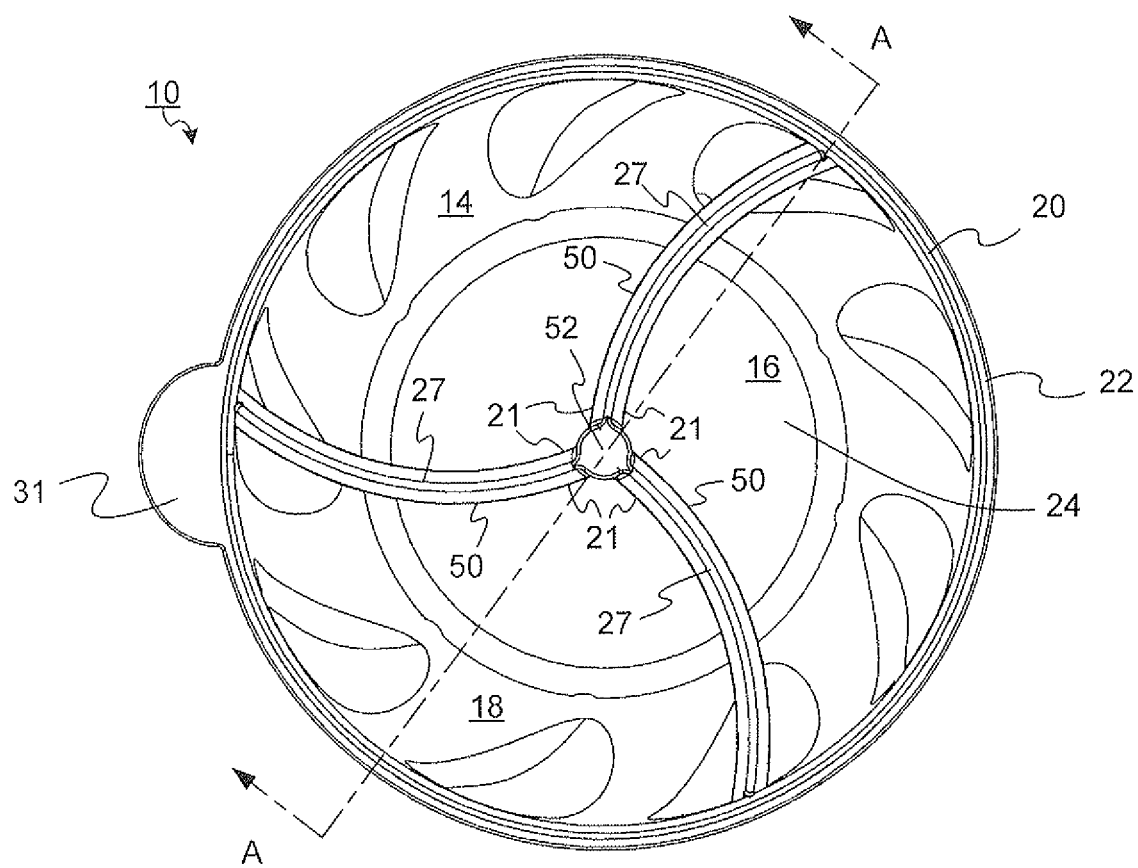
FIG. 4 illustrates a top view of the container.
Figure 6:
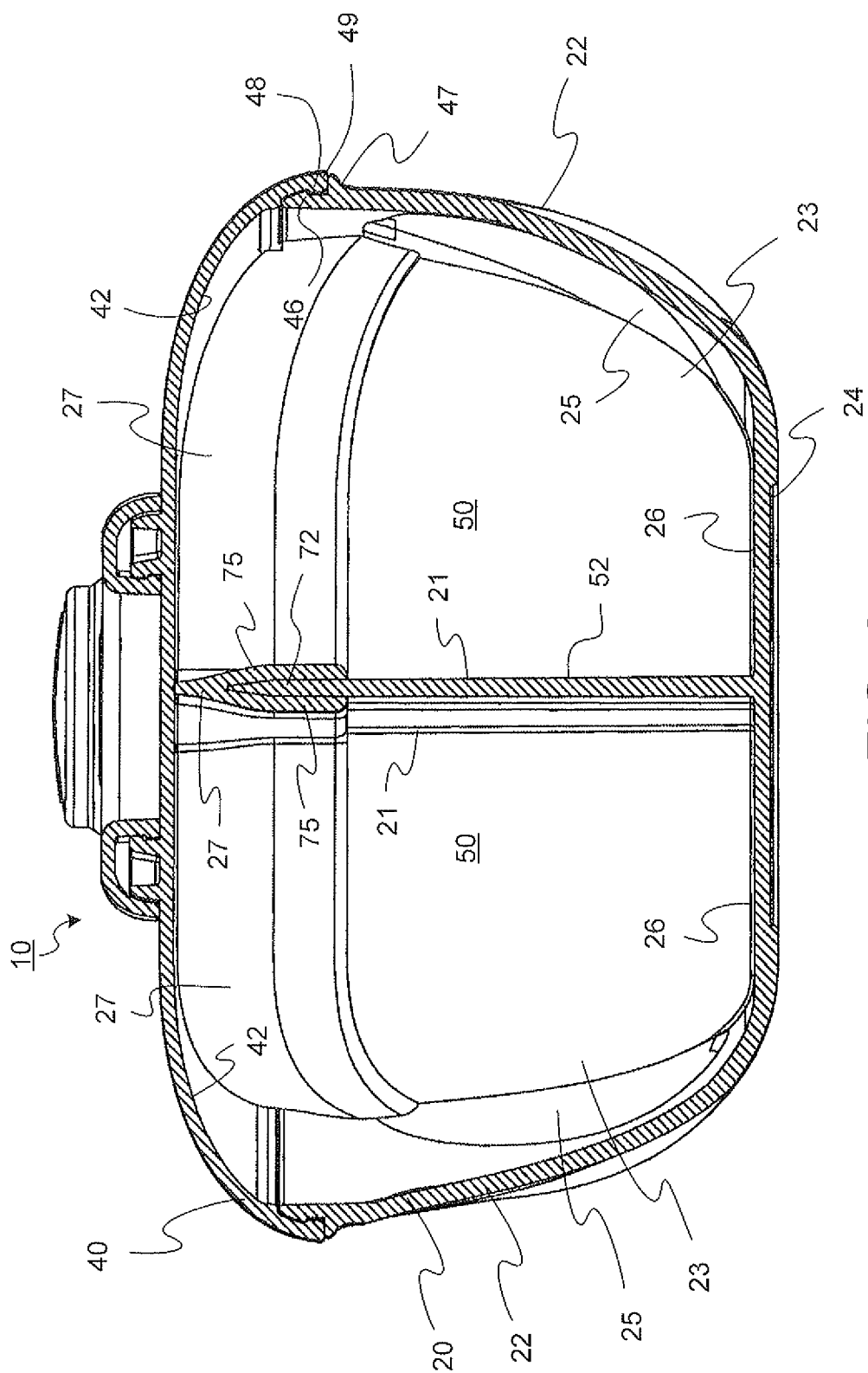
FIG. 6 shows a cross section view of the multi-compartment container assembly about line B-B in FIG. 3.
Figure 10:
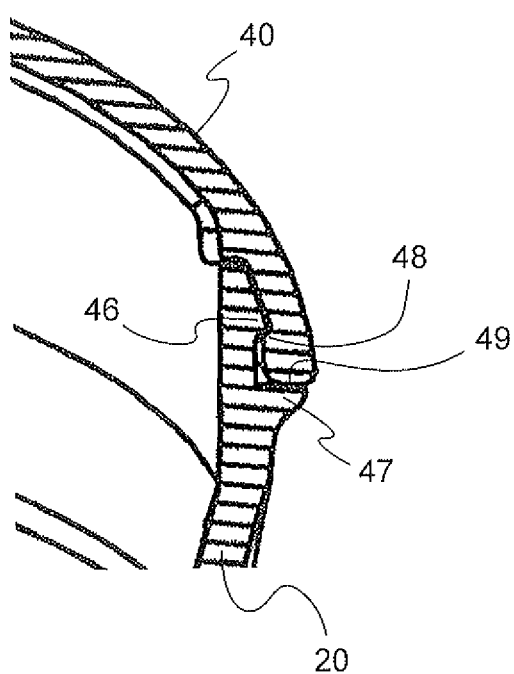
FIG. 10 shows an exploded exemplary view of the connection between the container and the lid.

FIG. 3 is a side view that illustrates the lid 40 has a domed shaped construction. The lid 40 is attached to the container 20 by a snap fit attachment, as shown in FIGS. 6 and 10 and discussed in greater detail below. As such, the lid 40 can rotate concentrically over the top open end of the container 20 so that a spout 60 can be rotated over one of the various sub-compartments 14, 16, 18 for dispensing of the contents therein.

Although the lid 40 is attached to the container 20 by a snap fit attachment, it is to be understood that the lid 40 may be attached to the container 20 via a threaded fastener fit and/or any suitable means used to detachably secure the lid 40 to the container 20. In this event, another portion of the lid 40 may be provided to rotate the spout 60 over each of the various sub-compartments 14, 16, 18.

FIGS. 3-6 show the various radially extending partitions 50. Each of the radially extending partitions 50 are constructed integral with each other, and have inner peripheral ends 21 that meet at the center 52 of the container 20. Outer peripheral ends 23 of the radially extending partitions 50 merge integral with an interior surface 25 of the bowl-shaped wall 22. A lower end 26 of the partitions 50 merge integral with a lower end 24 of the bowl-shaped wall 22 of the container 20. The container 20 is capable of being formed in the usual manner of the formation of such containers such as by molding or the like.

Figure 5:
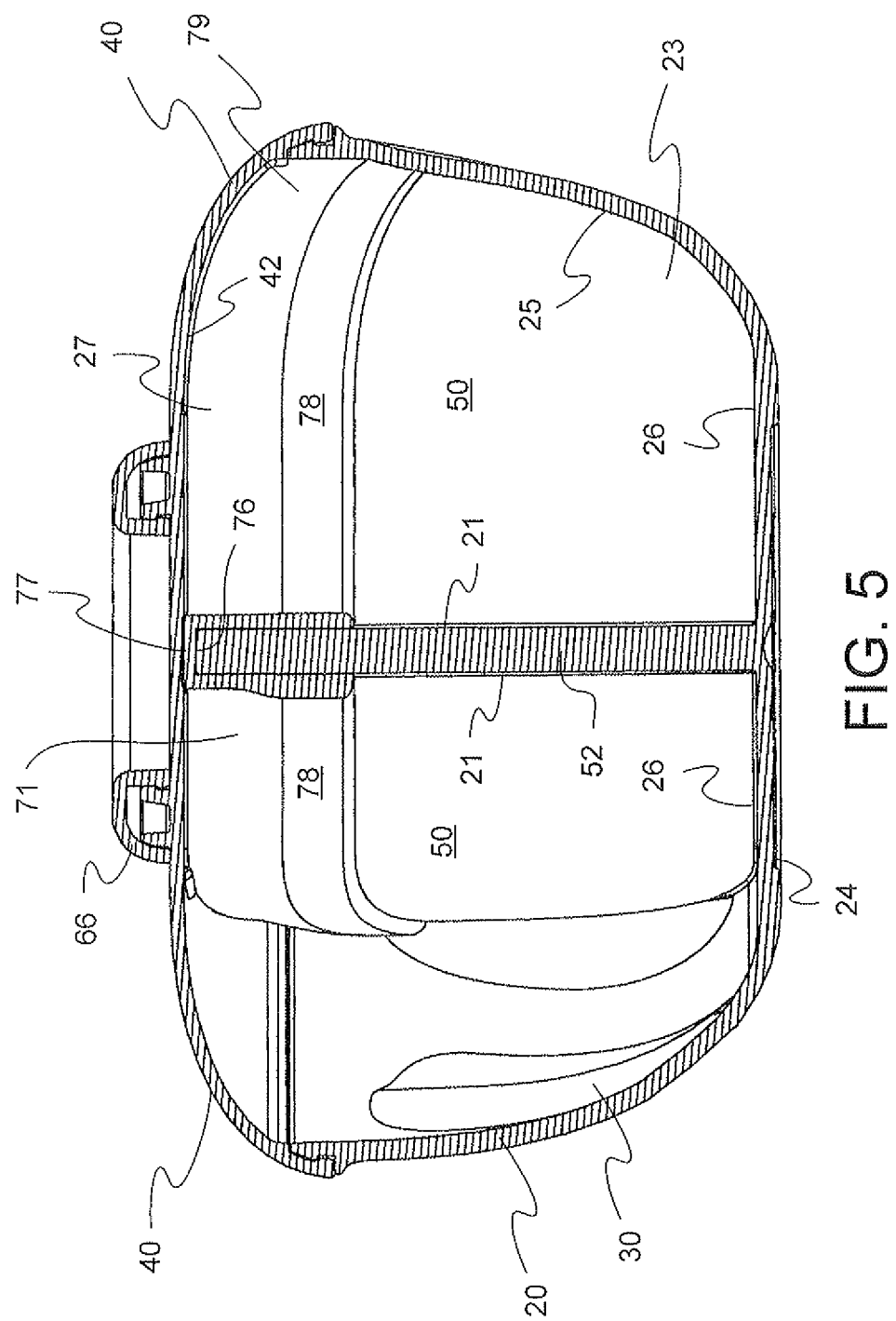
FIG. 5 depicts a cross section view of the multi-compartment container assembly about line A-A in FIG. 4.

An upper end 27 of the individual radially extending partitions 50 is composed of a resilient flexible material capable of flexing at the upper end 27 against an inner surface 42 of the lid 40. That is, as shown in FIGS. 5 and 6, when the lid 40 is secured to the container 20, the upper ends 27 of the radially extending partitions 50 are biased against the inner surface 42 of the lid 40. The upper ends 27 of the partitions 50 are slightly deformed against the inner surface 42 of the lid 40 such that the upper ends 27 of the partitions 50 act as a seal for contents provided in the various sub-compartments 14, 16, 18.

The advantage to providing flexible upper ends 27 to the partitions 50 is to prevent the contents of one of the sub-compartments 14, 16, 18 from bleeding over the top edge of a partition 50 into an adjacent sub-compartment 14, 16 and 18. The lid 40 is adapted to rotate a spout 60 over, and in alignment with one of the various sub-compartments 14, 16 and 18 within the container 20. As the lid 40 rotates, the flexible upper ends 27 of the partitions 50 act like a squeegee or wiper blade swiping against the inner surface 42 of the lid 40 by scraping the inner surface 42 of the lid 40 thereby sealing the various sub-compartments 14, 16 and 18 from each other within the container 20.

Partitions 50 may also be removable from the container 20. In this way, both partitions 50 and center post 52 may be flipped upside down and placed back into container 20 in a mirrored position. The lower edge 26 of the partition may also be flexible such that when the partition 50 is flipped the previously positioned lower edge 26 may act as the flexible upper ends 27.

Figure 7:
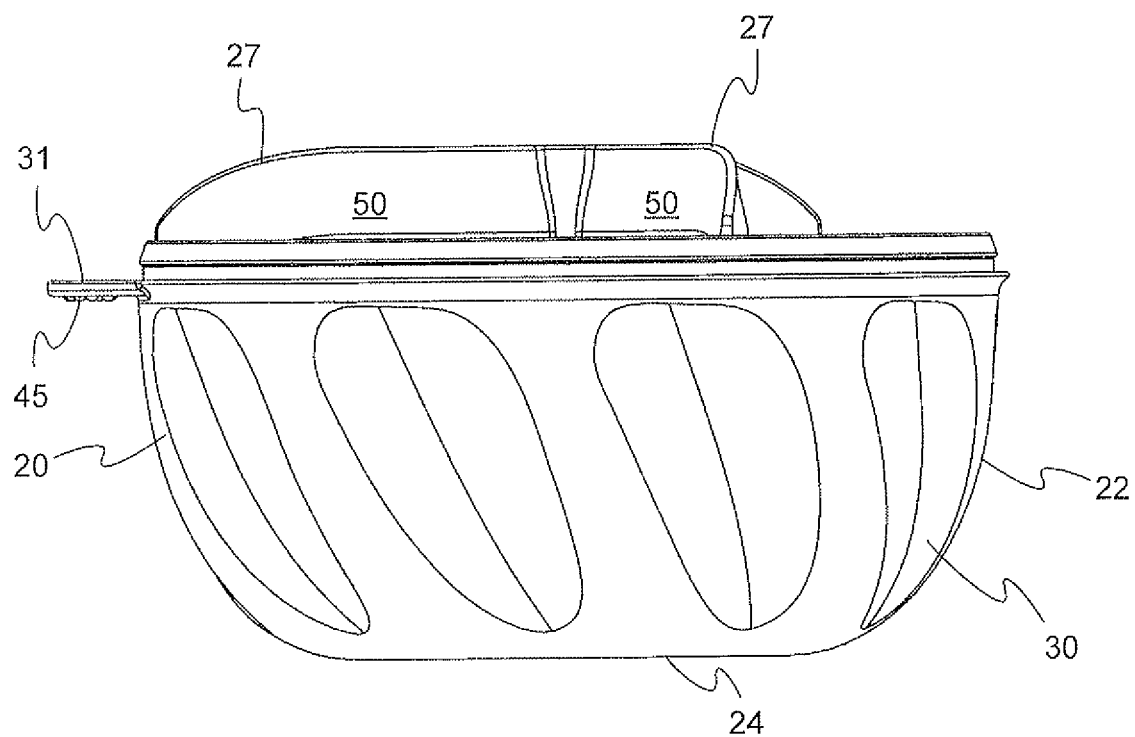
FIG. 7 illustrates a side view of the container and the upper end of the partition extending in a convex configuration above the top peripheral edge of the container.

FIGS. 5-7 show the flexible upper ends 27 of the partitions 50 may be convex in shape. When viewed from the side, as in FIG. 5, the flexible upper end 27 may be generally flat at a proximal end 71 and gradually curve downward when approaching an outer peripheral end 79. Similarly, the inner surface 42 of the lid 40 has a mating shape symmetric to the convex shape of the flexible upper ends 27 of the partitions 50. The flexible upper ends 27 of the partitions 50 and the mating inner surface 42 shape of the lid 40 provides a smooth and continuous convex surface for engagement. The engagement therefore provides a continuous seal between the flexible upper ends 27 and the lid 40.

Figure 8:
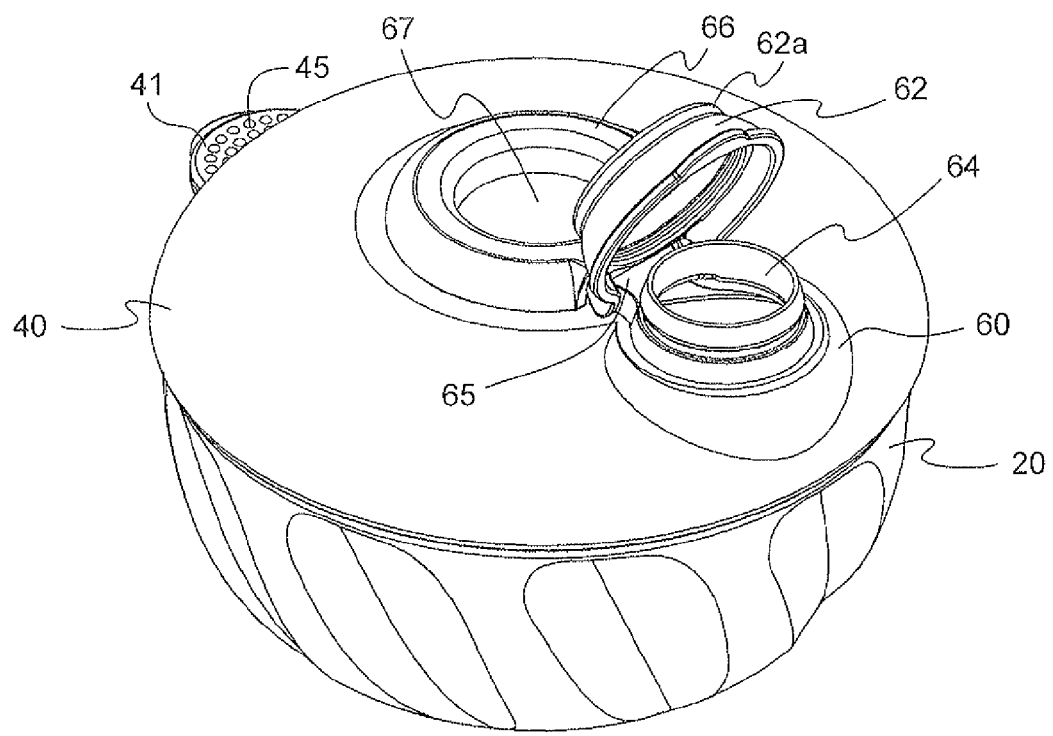
FIG. 8 shows an upper perspective view of the multi-compartment container assembly with the spout cover in a partially open position.
Figure 9:
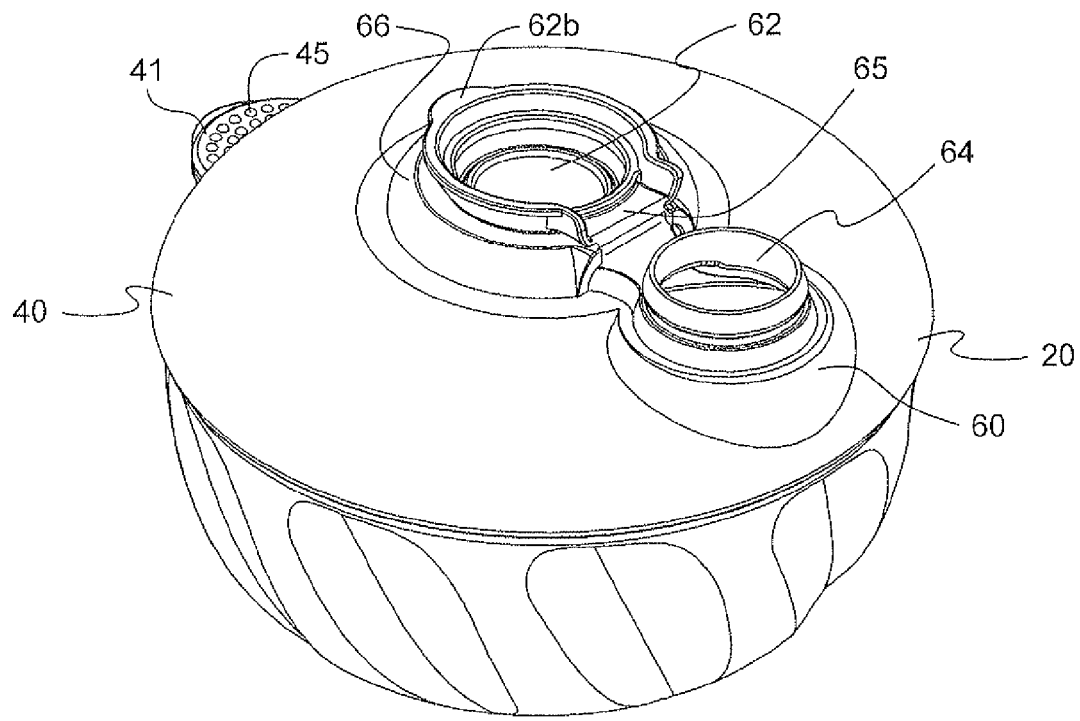
FIG. 9 depicts an upper perspective view with the spout cover in a fully open and locked position.

FIG. 8 depicts a spout cover 62 in a partially open position, and FIG. 8 shows the spout cover 62 in a locked open position. In use, the spout 60 in the lid 40 is rotated over the sub-compartments 14, 16 and 18 within the container 20. Referring back to FIG. 2, the spout cover 62 is capped over a mouth 64 of the spout 60 in a closed position. As shown in FIGS. 8 and 9, in a partially and completely open position, the spout 60 is aligned with one of the various sub-compartments 14, 16 and 18 and the spout cover 62 is lifted off of the mouth 64 of the spout 60 allowing the contents within the sub-compartment 14, 16 18 aligned with the mouth 64 of the spout 60 to flow through the mouth 64 when tipped over.

FIGS. 2 and 8-9 show the spout cover 62 hingedly connected to a concentric housing 66 disposed on a top of the lid 40. That is, the spout lid 62 is connected by a pivoting flexible strap 65 to a concentric housing 66 attached to the lid 40. The concentric housing 66 includes a recess 67 that is adapted to securely receive the upper end 62a of the spout lid 62 when the spout lid 62 is pivoted into an open position. The upper end 62a of the spout lid 62 (as shown in FIG. 8) has a contour adapted to snugly fit within the recess 67 of the concentric housing 66 (as shown in FIG. 8). The spout cover 62 may also include a lifting tab 62b to facilitate moving the spout cover 62 from the open position to the closed position and vice versa.

The flexible strap 65 may be selected from a variety of flexible materials, such as a polymer, rubber and/or other suitable material capable of enduring repetitive bending or folding back and forth from a closed position (as shown in FIG. 2), to a partially open, and fully open stored position (as shown in FIGS. 8-9 respectively).

Referring back to FIGS. 1-3, tabs 31 and 41 may be provided on the container 20 and the lid 40 respectively. The tabs 31 and 41 allow a user to more easily separate the lid 40 from the container 20 or rotate lid 40 to line up the spout 60 with openings 14, 16, 18. A plurality of small protuberances or gripping nubs 45 may be provided on the tabs 31, 41 as a convenient way for a user to grip on to the various tabs 31, 41 while in use.

FIG. 10 illustrates an exploded view of the exemplary snap-lock connection made between the container 20 and the lid 40. The container 20 includes a notched edge 46 and a projection lip 47 adjacent to the upper opening of the container 20. The lid 40 includes a mating notched edge 48 end adapted to matingly engage and captivate the notched edge 46 on the container 20. When a snap fit connection is made between the lid 40 and container 20, a peripheral end 49 of the lid 40 rests against the projection lip 47 on the container 20. It is to be understood that various other suitable connections may be made between the container 20 and the lid 40.

The lower end 24 of the container 20 is shown (FIGS. 2 and 5-6) flattened out generally conforming to a flat surface (like a table) upon which the lower end 24 of the container 20 may be placed. Likewise, the lower end 26 of the partition 50 may also be flat in construction.

The flexible upper edge 27 of the partition 50 may be integrated in a variety of different ways. For example, the upper edge 27 of the partition 50 can be co-molded, fused or attached in any suitable manner onto an upper wall 50a of the partitions 50, as will be shown and discussed below. Likewise, the entire partition 50 can be made of the flexible material such that the upper edge 27 of the partition 50 is thinner and adapted to flex more than the lower end of the partition 50. However, it is to be understood that the upper edge 27 of the partition 50 may be constructed in any suitable manner according to this subject disclosure.

Figure 11:
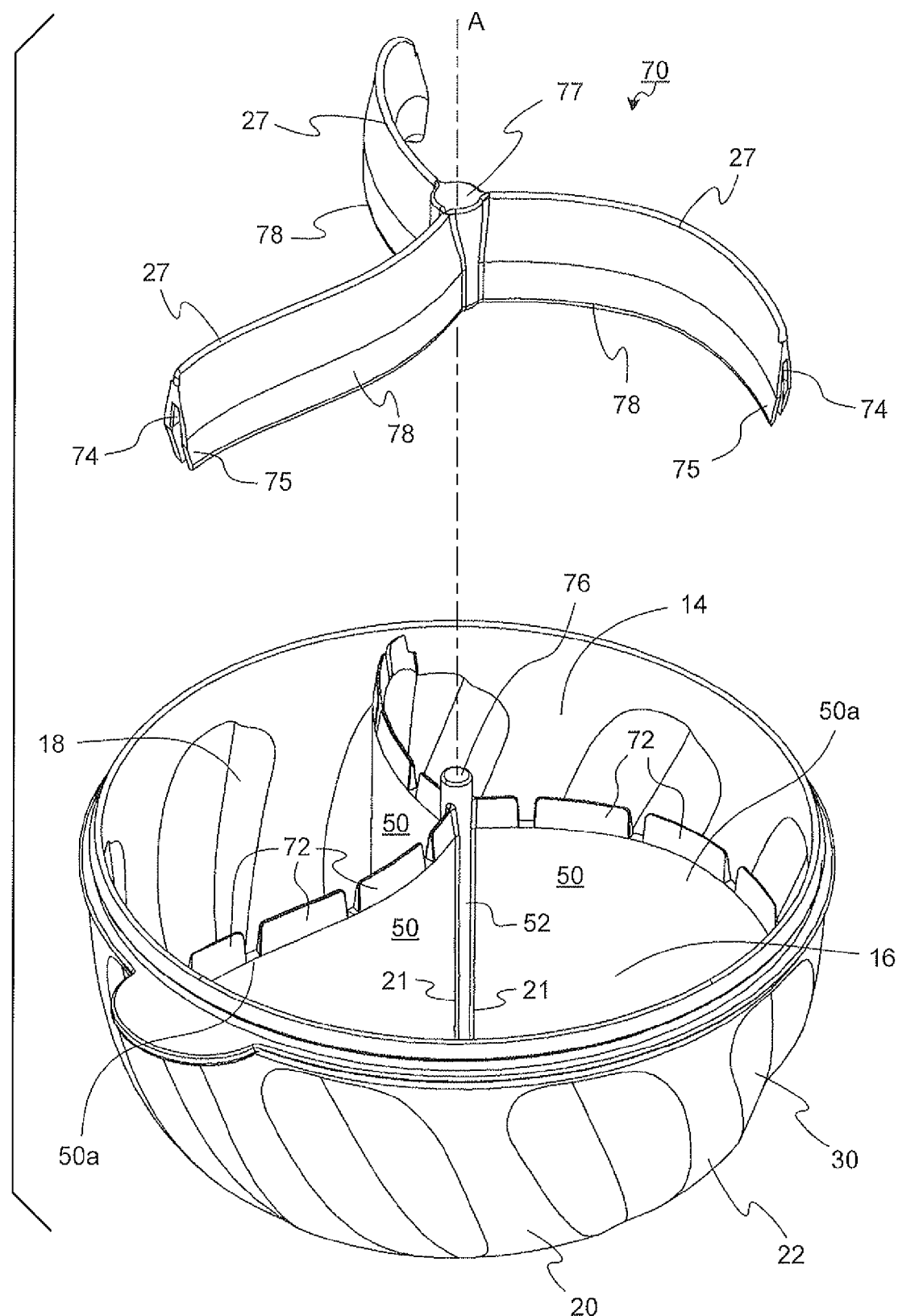
FIG. 11 illustrates an exploded view of the flexible partition unit lifted off of the remainder of the partition according to the subject disclosure.

FIG. 11 shows that the flexible upper edge 27 may be constructed as a single flexible unit 70 adapted to fit over the top of an upper end of the various partitions 50 and the center post 52. As before, the upper edge 27 of the flexible unit 70 has the same convex contour as the inner surface 42 of the lid 40 and is adapted to fit on top of an upper wall 50a of the partition 50.

In particular, the upper wall 50a on the partition 50 shown in FIG. 11 and cross section view FIG. 6 includes a plurality of guide projections 72. The plurality of guide projections 72 are adapted to fit securely within a recess 74 within the flexible unit 70. A central cap 77 is adapted to fit over a central alignment projection 76 provided at the center post 52 of the partitions 50. That is, the central cap 77 and recess 74 in a lower end 78 of the flexible unit 70 are aligned with, and placed onto the central alignment projection 76 and the projections 72 in a secure manner. It is to be understood that the flexible unit 70 may be permanently attached to the upper wall 50a of the partitions 50.

Alternatively, the flexible unit 70 may be removably attached to the upper wall 50a of the partitions 50. The lower end 78 of the flexible unit 70 may be constructed substantially rigid to be securely connected to a rigid partition 50 at the upper wall 50a. The upper edge 27 may be co-molded or attached to the lower end 78 of the flexible unit in the manner shown in FIG. 11. Although the partitions 50 are shown having a curve in the radial extension, it is to be understood that the partitions 50 may be straight, curved, or various other shapes.

When viewed along axis A in FIG. 11 (and as shown in top view FIG. 4), the partitions 50 and flexible upper ends 27 may be radially curved in a counter-clockwise direction. An advantage of providing curved partitions 50 is to enhance the sweep angle and increase the connectivity of the flexible upper ends 27 to the inner surface 42 of the lid 40 during relative rotation of the lid 40 and container 20. It is to be understood, however, that the partitions 50 and flexible upper ends 27 may be curved in other configurations or be straight.

Figure 12:
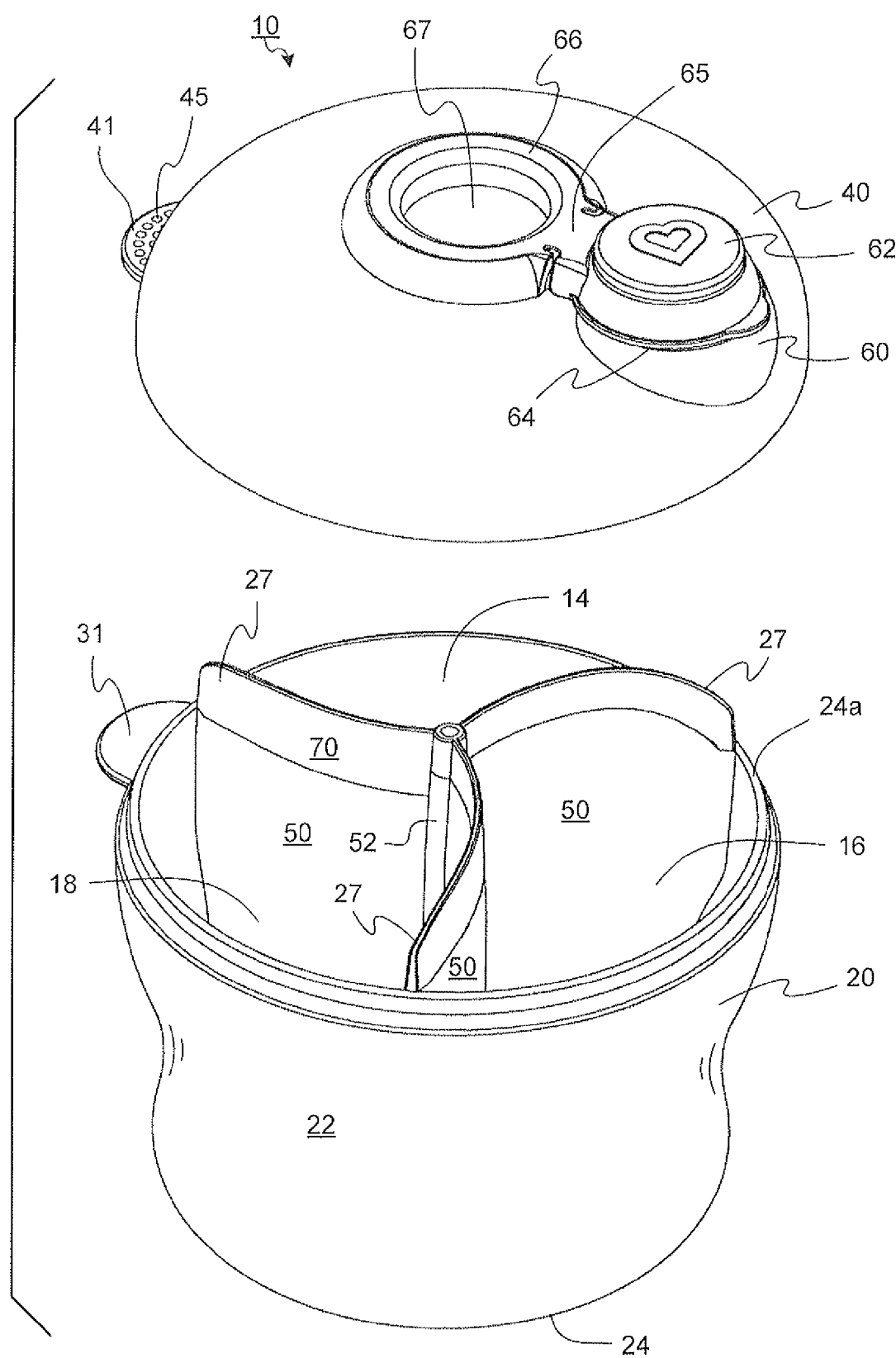
FIG. 12 depicts another exploded view of the multi-compartment container assembly.
Figure 13:
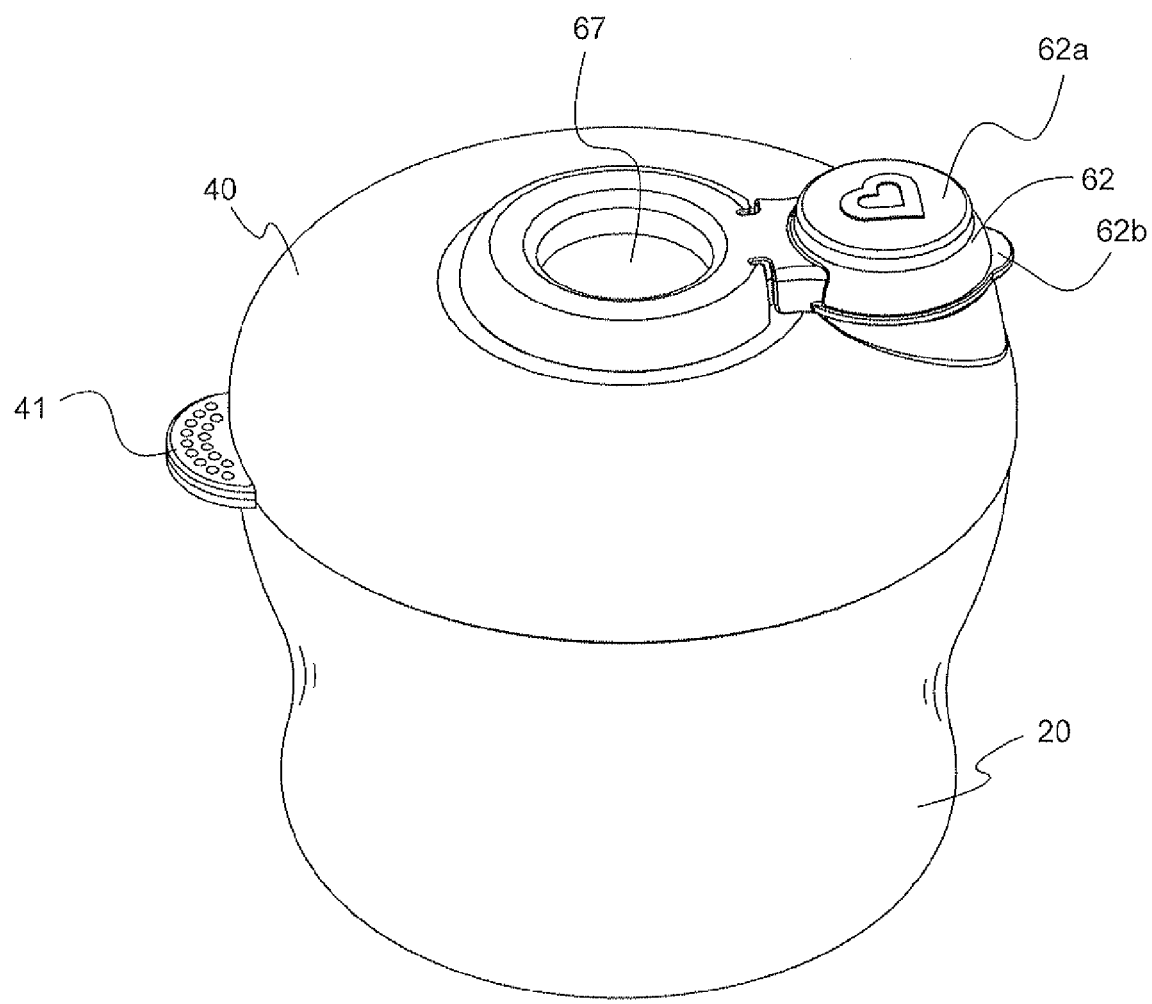
FIG. 13 shows an upper perspective view of the multi-compartment container assembly.

FIGS. 12-13 show another perspective view of the multi-compartment container assembly 10. The construction for the container assembly 10 is similar to the embodiments described above with minor changes. Here, the flexible unit 70 is fused with the partition 50, as will be discussed in greater detail below.

Figure 14:
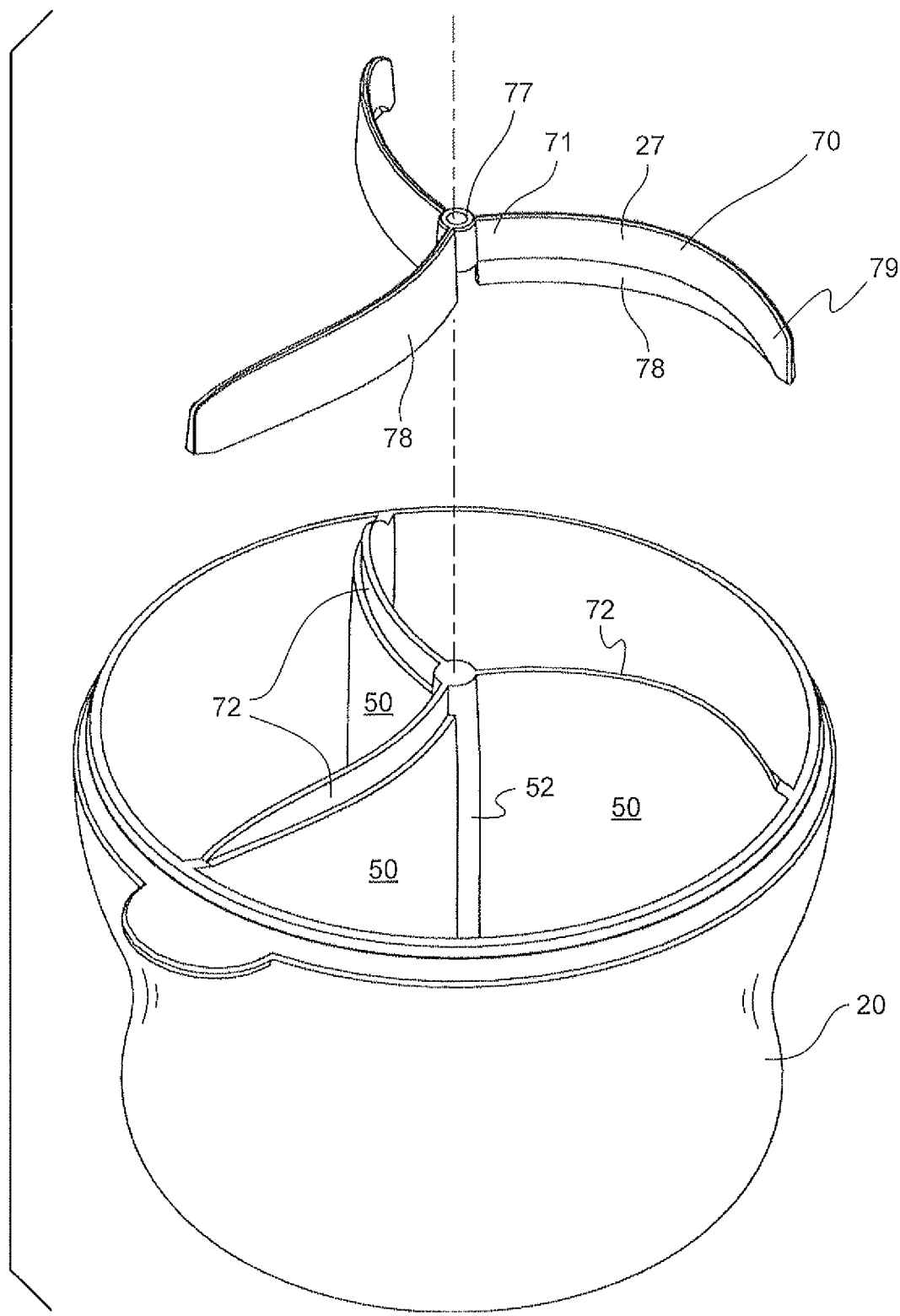
FIG. 14 depicts an exploded view of the flexible partition unit lifted off of the remainder of the partition according to the subject disclosure.
Figure 17:
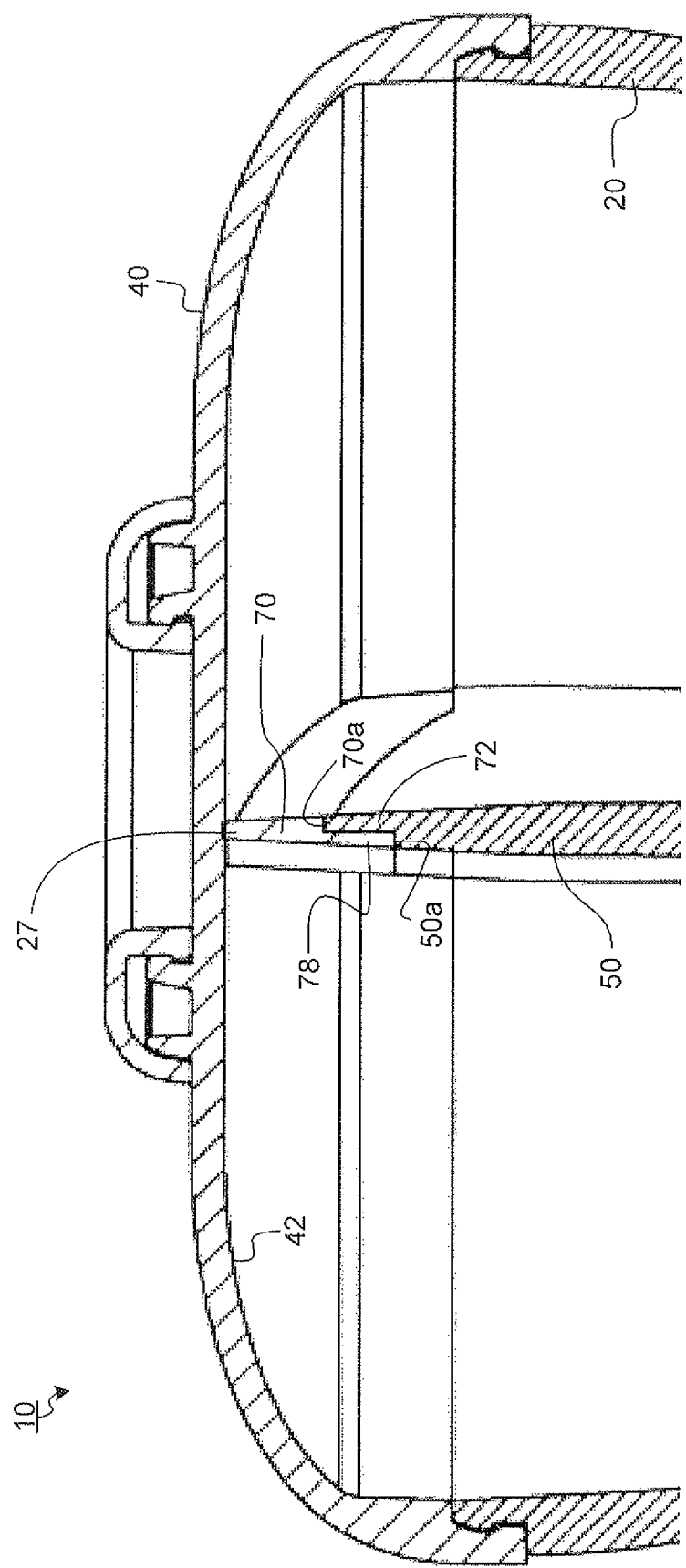
FIG. 17 depicts an exploded partial view of the connection between the container and the flexible partition as shown in FIG. 16.

FIG. 14 illustrates an exploded view of the flexible unit 70 lifted off of the remainder of the partitions 50. FIG. 17 further shows an enlarged view of the flexible unit 70 over the guide projections 72 of the partitions 50. Here, the lower end 78 of the flexible unit 70 acts as an interconnecting end and is slightly thinner than a midportion of the flexible unit 70 and extends downward, towards the container 20. The lower end 78 of the flexible unit 70 is adapted to matingly sit flush with the guide projection 72, which similarly is slightly thinner than and extends upwardly from the partition 50.

Figure 15:
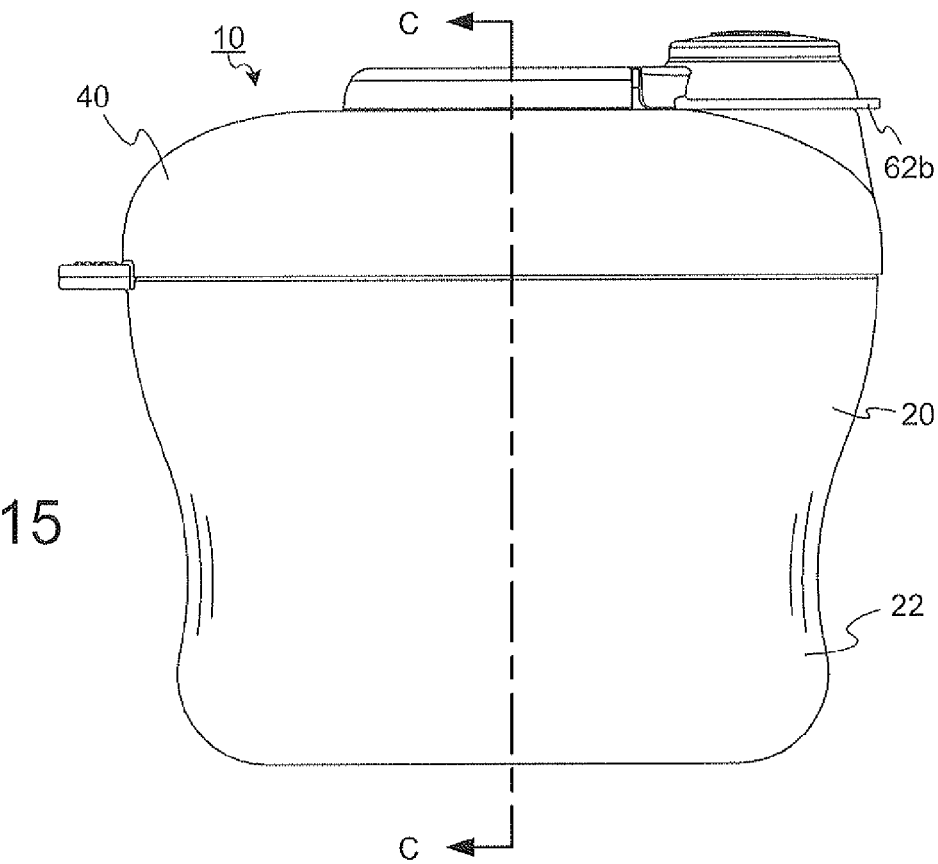
FIG. 15 shows a side view of the multi-compartment container assembly.

FIG. 15 shows a side view of the container 10. Here, the side-wall 22 may be slightly narrowed and/or concave. As such, a user may concentrically wrap his or her fingers around the container in a gripping fashion.

Figure 16:
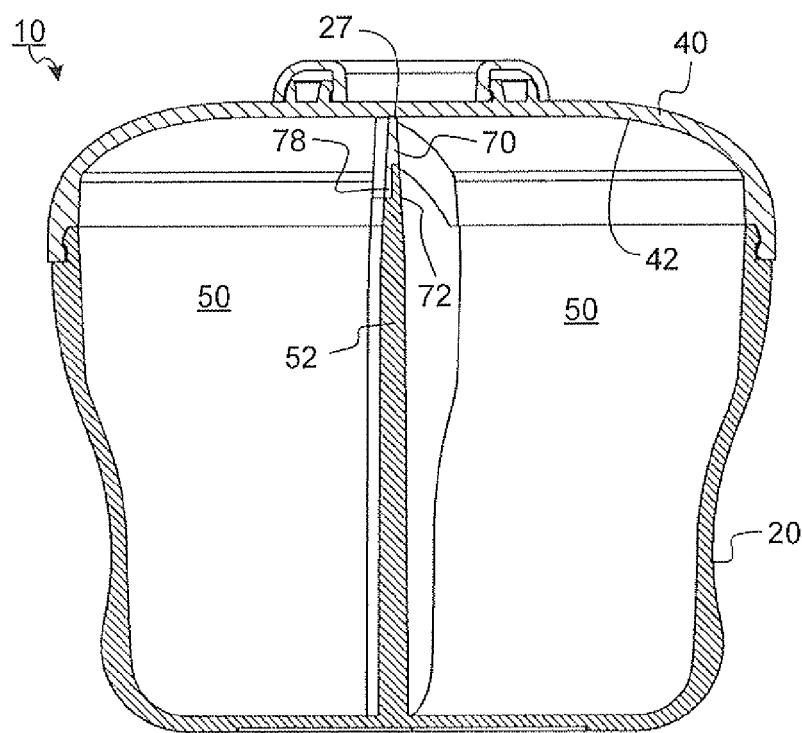
FIG. 16 illustrates a cross section view of the multi-compartment container assembly about line C-C in FIG. 15.

FIGS. 15-17 depict the mating connection between the lower end 78 of the flexible unit 70 and the guide projection 72 in greater detail. FIGS. 16-17 show an enlarged cross section of the container assembly 10. The lower end 78 of the flexible unit 70 matingly interconnects with and lies flush with the guide projection 72. An edge 70a of the flexible unit 70 rests against the guide projection 72 and the upper wall 50a of the partition 50 rests against the lower end 78 of the flexible partition 70. In addition, the lower end 78 may rest against a first side (left side) of the guide projection 72, as shown in FIG. 17. Alternatively, the lower end 78 may rest against the right side of the guide projection 72 as shown in FIG. 1. In an even different embodiment, the lower end 78 may be constructed to rest on both sides of the guide projection 72 as shown in FIG. 2, or in any other suitable configuration to connect the flexible unit 70 with the partitions 50. Furthermore, apertures or holes (not shown) may be disposed within the guide projection 72 to lock in the flexible unit 70.

The attachment construction for the flexible unit 70 as shown in FIG. 12 is the mirror construction of the flexible unit 70 as shown in FIG. 1. When the lid 40 is rotated about the container 20, the inner surface 42 of the lid 40 applies a force against the upper edge 27 of the flexible unit 70 in either a clockwise or counter-clockwise direction depending on the direction of the lid 40 being rotated. When rotating the lid 40 in a clockwise direction, an advantage of the configuration as shown in FIG. 12 is to provide the upper end 27 with support from the guide projection 72 against the force applied by the lid 40. When the lid 40 is rotated in a counter-clockwise direction, an advantage of the configuration as shown in FIG. 1 is to provide the outer peripheral end 79 additional support from the guide projection 72. This helps prevent the upper end 27 from being overly distorted by the outer peripheral end 79 being bent by the lid 40 during rotation.

An adhesive may be applied to either the lower end 78 or the mating surface on the guide projection 72 in order to facilitate the secure mating connection of the flexible unit 70 to the partitions 50. Similarly, the flexible unit 70 and the partitions 50 may be co-molded or fused by any other suitable attachment method as previously discussed. Referring back to FIG. 14, in this manner, the central cap 77 may be secured to the container 20 by resting or butting up against, and in alignment with the center post 52 of the container 20, as opposed to being secured over by the central alignment projection 76 provided in a recess below the central cap 77 (such as shown in FIG. 11).

Figure 18:
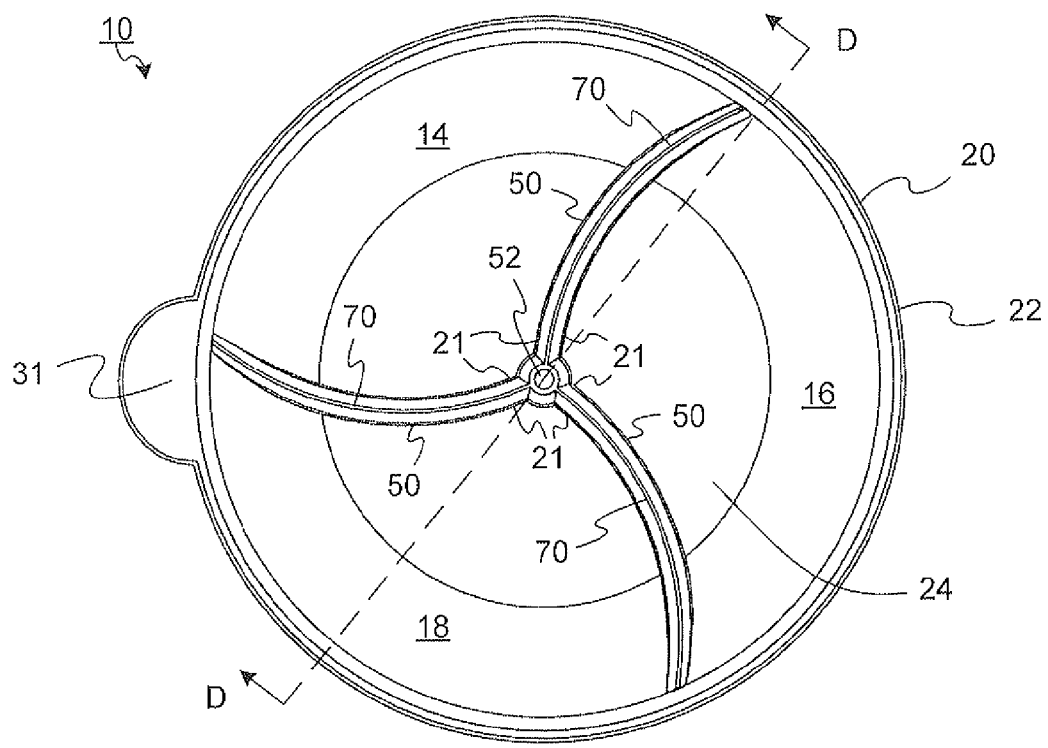
FIG. 18 shows a top view of the multi-compartment container assembly.
Figure 19:
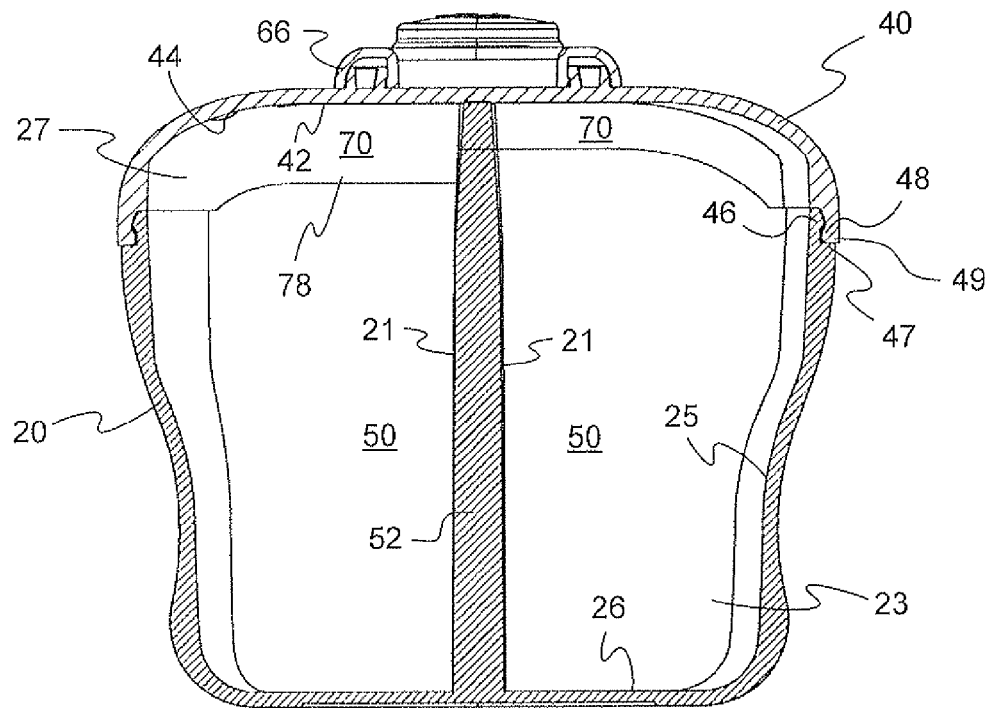
FIG. 19 illustrates a cross section view of the multi-compartment container assembly about line D-D in FIG. 18.
Figure 20:
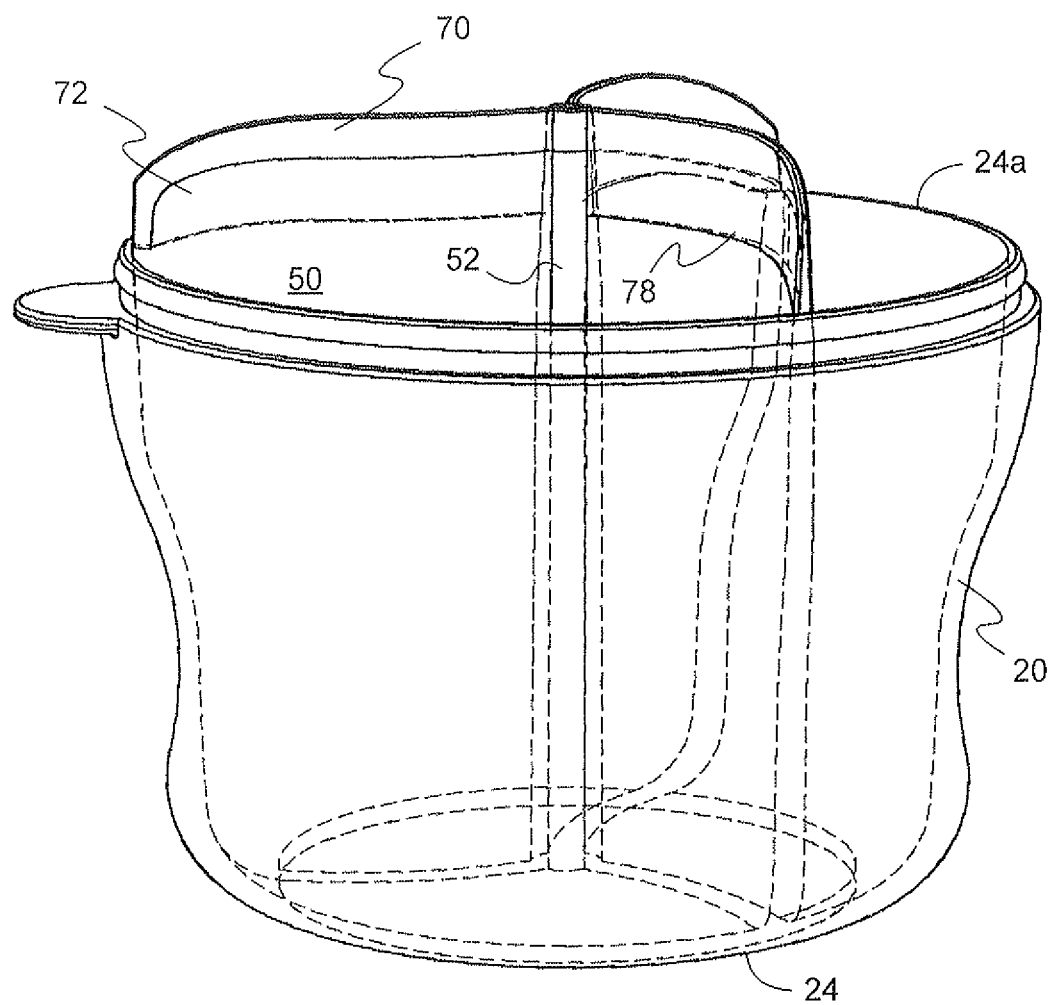
FIG. 20 depicts a partially transparent side perspective view of the container and the upper end of the partition extending in a convex configuration above the top peripheral edge of the container.

As before, and as shown in FIGS. 18-20, the flexible upper edge 27 of the partition 50 is biased against the inner surface 42 of the lid 40. In this way, the upper edge 27 acts as a seal between the various sub-components 14, 16, 18 to prevent material disposed within any one sub-compartment 14, 16, 18 from contaminating other substances in any of the other sub-compartments 14, 16, 18.

Furthermore, at least one alignment tab 44 may project from the lid 40 towards the inside of the container 20. The tab 44 may act as both a visual and tactile alignment indicator, giving the user feedback as to when the spout 60 is centrally isolated over a single sub-compartment 14, 16, 18. When the user rotates the lid 40, the upper edge 27 of the flexible unit 70 will slightly flex over the tab 44 when the spout 60 is clear of the partitions 50, which will provide the tactile feedback.

In addition, there could be multiple tabs 44 which may project into the container on either side of the flexible unit 70 when the spout 60 is clear of the partitions 50. This will not only slightly hold the lid 40 in this position, but will provide feedback if the lid 40 is rotated both counter-clockwise and clockwise.

The container assembly 10 may be preferably made of an unbreakable material, such as a polymer, a metallic composition and or any other suitable material normally employed for packaging small food items. The container assembly 10 may be either opaque or transparent. The container assembly 10 may be composed of a rigid material made preferably of a transparent plastic so as to permit viewing of the food item contained therein. The container assembly 10 may take any number of different sizes and shapes, such as cylindrical, bowl shaped, square, frusto-conical shaped side walls, a circular flat bottom and/or any other suitable shape in accordance with the present disclosure.

Various materials, for example, may include thermoplastic polyurethane (TPU) or thermoplastic polyesters (TPE), polyolefin Elastomers (POE). Other commercially available materials may include Engage, Sarlink, Texin, Desmopan, Dynaflex, Versalloy, Versaflex, and Elastolan. It should be noted that some or all of the above commercially available materials may be trademarks of the companies' manufacturing and/or selling the materials.

Although the container assembly 10 has been described as an anti-spill container assembly for storing and dispensing an infant formula, it will be understood that container assembly 10 has a variety of other uses. For example, container assembly 10 could also be used as a container for small non-food items, such as a jewelry container, a coin change container, a small hardware parts container assembly and/or any other suitable use for carrying and preventing the spillage of various items. As such, the anti-spill container assembly may be implemented in a virtually unlimited number of different applications.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

What is claimed:

1. A container assembly comprising:
a container having a closed end and an open end;
a lid having at least one spout disposed on an upper surface of the lid that is adapted to be attached to the open end of the container;
at least one partition separating the container into at least two subcompartments, the subcompartments being in direct communication with the at least one spout; and
a flexible swiping bladed edge provided on an edge of the at least one partition, the flexible swiping bladed edge adapted to allow rotation and remain in contact with and biased against an inner surface of the lid while the lid is rotated to prevent the at least two subcompartments from mixing.

2. The container assembly as recited in claim 1, wherein the flexible swiping bladed edge is capable of being deformed when the lid is rotated over the container as the flexible swiping bladed edge swipes over the inner surface of the lid.

3. The container assembly as recited in claim 1, wherein when the lid is rotated over the container, the spout is rotated over each of the subcompartments for selective dispensing.

4. The container assembly as recited in claim 1, wherein the flexible swiping bladed edge is removably attached to the at least one partition.

5. The container assembly as recited in claim 4, wherein the at least one partition has at least one guide projection adapted to be matingly attached adjacent to the flexible swiping bladed edge.

6. The container assembly as recited in claim 1, wherein the flexible swiping bladed edge is integrally attached to the at least one partition.

7. The container assembly as recited in claim 1, wherein the flexible swiping bladed edge has a first interconnecting end and the at least one partition has a second interconnecting end, the first interconnecting end matingly resting flush against the second interconnecting end as a one-piece construction.

8. The container assembly as recited in claim 1, wherein the lid further comprises a spout cover adapted to fit over the spout.

9. The container assembly as recited in claim 8, wherein the spout cover is hingedly connected to the lid.

10. The container assembly as recited in claim 1, wherein the partition extends radially outward and away from a central axis concentric to an upper edge of the container.

11. The container assembly as recited in claim 10, wherein the at least one partition is curved radially outward when viewed along the central axis.

12. The container assembly as recited in claim 1, wherein the inner surface of the lid is concave, and an upper surface of the flexible swiping bladed edge is complementarily convex.

13. The container assembly as recited in claim 1, wherein the lid further comprises an alignment tab projecting from the inner surface of the lid, the alignment ridge contacting an upper surface of the flexible swiping bladed edge as the lid is rotated over the container.

14. A container assembly comprising:
a container having a closed end and an open end;
a lid having a spout disposed on an upper surface of the lid and a spout cover that is adapted to be attached to the open end of the container; and
at least one partition having a flexible swiping bladed edge on an edge of its upper end in contact with an inner surface of the lid, the flexible swiping bladed edge on the upper end capable of being deformed when the lid is rotated over the container as the flexible swiping bladed edge swipes over the inner surface of the lid to prevent at least one substance from mixing across the partition.

15. The container assembly as recited in claim 14, wherein the container further comprises at least two subcompartments, and when the spout is in direct communication with a single subcompartment containing a substance, the flexible swiping bladed edge seals the remaining subcompartments.

16. The container assembly as recited in claim 14, wherein the flexible swiping bladed edge is biased towards and completely flush against the inner surface of the lid, and when the lid is rotated over the container the flexible swiping bladed edge remains in contact with the inner surface of the lid.

17. The container assembly as recited in claim 14, wherein the spout cover pivots when moving from a closed position to an open position, or from the open position to the closed position.

18. The container assembly as recited in claim 14, wherein the lid further comprises a recess adapted to securely receive an upper end of the spout cover when the spout cover is pivoted into an open position.

19. A multi-compartment container assembly comprising:
a container having an open end, a closed end, a central axis, and at least two subcompartments;
a lid, attached to the open end of the container, having at least one spout disposed on an upper surface of the lid and a spout cover;
at least one partition radially disposed about the central axis which separates the at least two subcompartments, the subcompartments being in direct communication with the at least one spout; and a flexible swiping bladed edge disposed on an edge of the at least one partition, such that when the lid rotates about the container, the flexible swiping bladed edge bends and is biased against the lid to prevent mixing of the at least two subcompartments.

20. The multi-compartment container assembly as recited in claim 19, wherein when the spout is in fluid communication with a single subcompartment, the flexible swiping bladed edge seals the remaining subcompartments.

* * * * *